Apr. 3, 1923.  1,450,268
D. TURNER
MACHINE FOR MEASURING FABRICS
Filed Nov. 15, 1919  3 sheets-sheet 1

Witness:
Harry S. Gaither

Inventor:
Douglas Turner
by Sheridan, Jones, Sheridan & Smith Attys

Apr. 3, 1923.                                                                                     1,450,268
D. TURNER
MACHINE FOR MEASURING FABRICS
Filed Nov. 15, 1919                                                                3 sheets-sheet 2
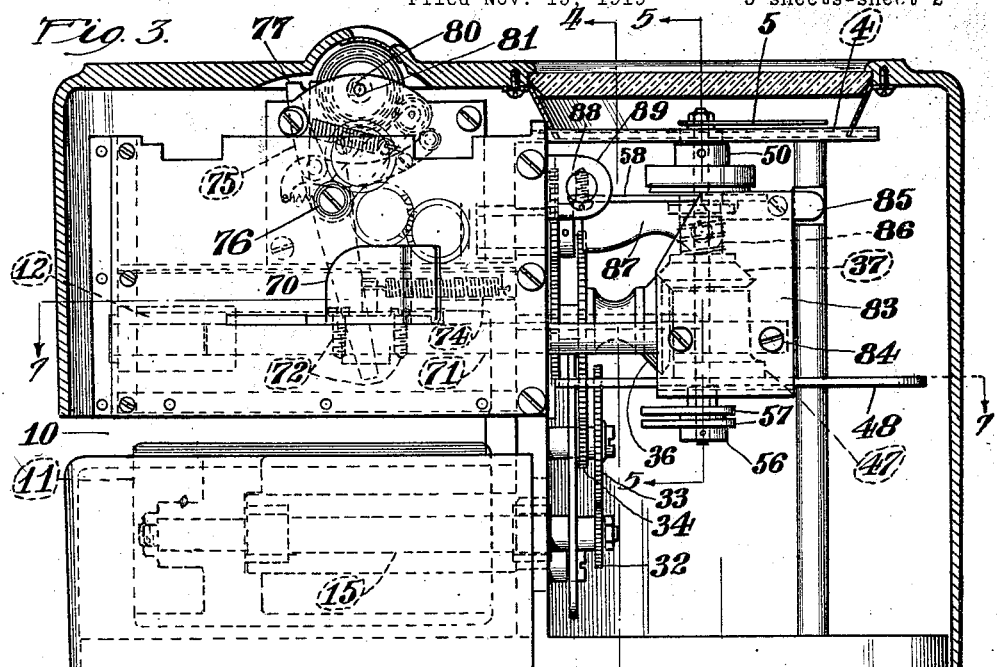
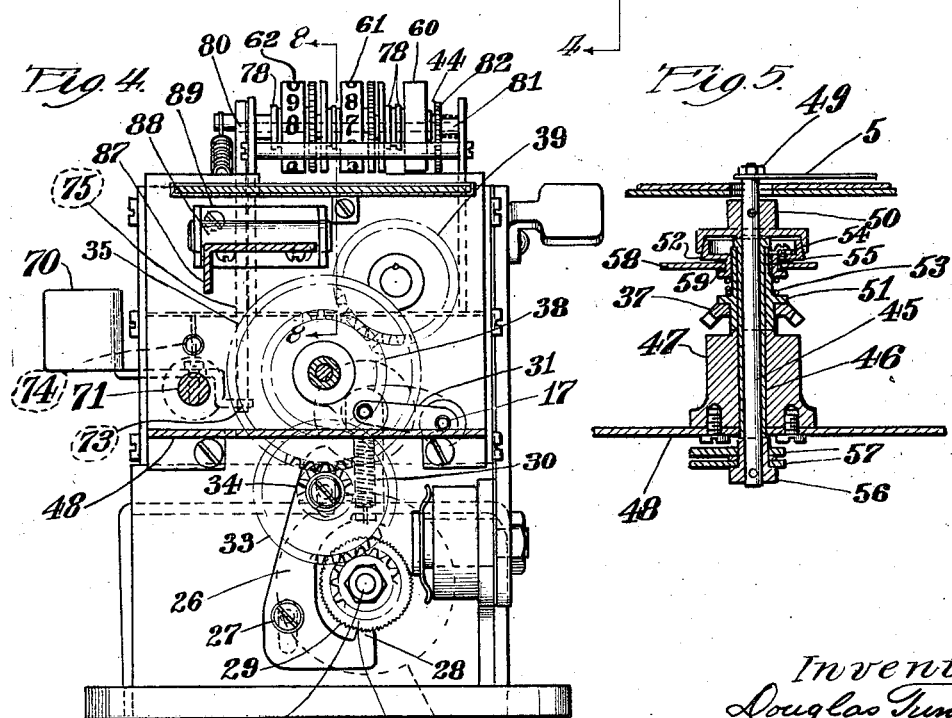
Inventor.
Douglas Turner.
Witness:
Harry S. Gaither
by Sheridan, Jones, Sheridan & Smith Attys

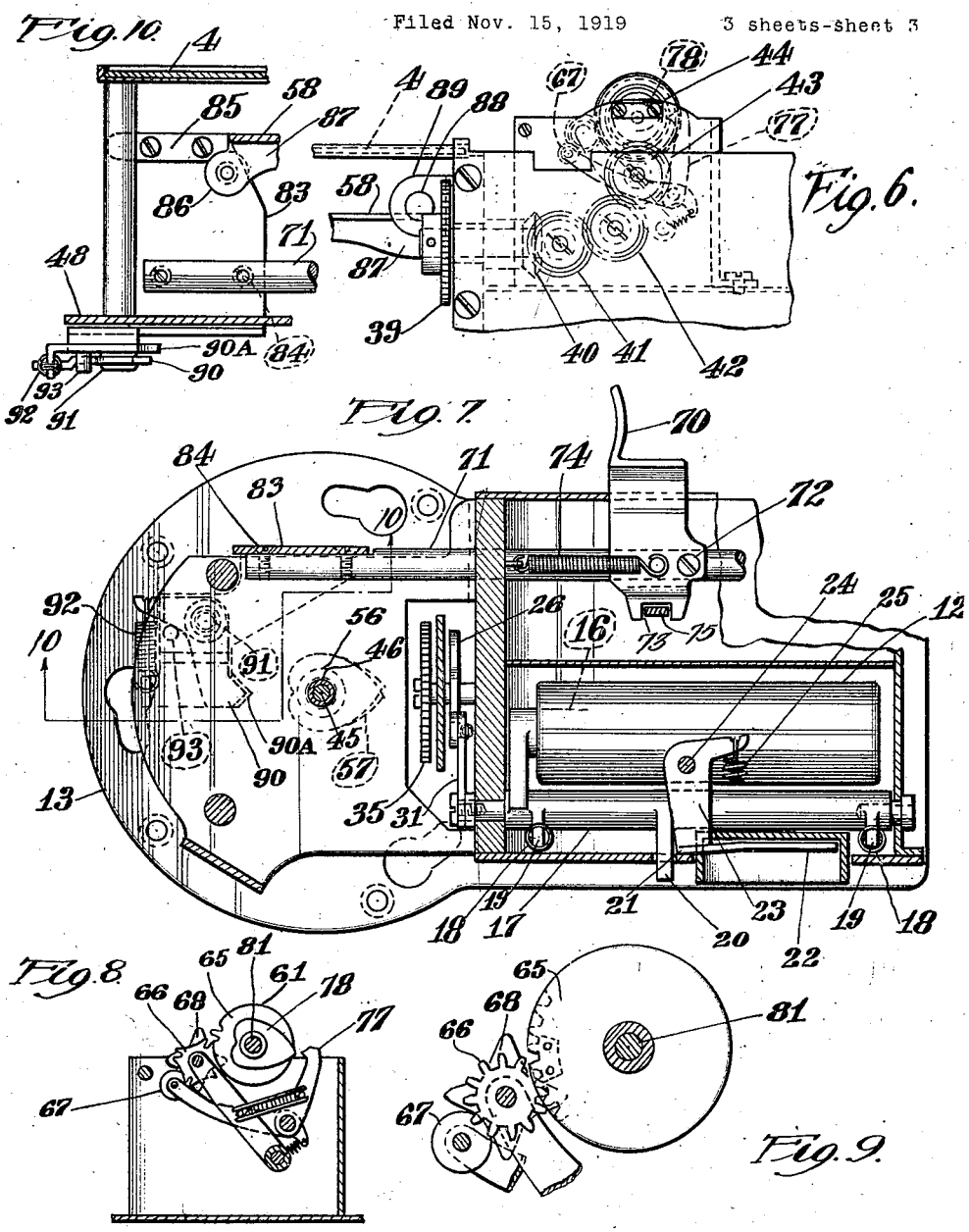

Patented Apr. 3, 1923.

1,450,268

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF DELAWARE.

MACHINE FOR MEASURING FABRICS.

Application filed November 15, 1919. Serial No. 338,231.

*To all whom it may concern:*

Be it known that I, DOUGLAS TURNER, a citizen of the United States, residing at St. Louis, in the State of Missouri, have invented certain new and useful Improvements in Machines for Measuring Fabrics, of which the following is a specification.

This invention relates to improvements in machines for measuring textile fabric, ribbon, and the like.

One of the objects of the invention is to provide an improved machine of this character which will have an unlimited measuring capacity. Another object is to provide a machine of this character in which the total number of yards measured are indicated to the eye by counters or numeral wheels that are periodically advanced, only the fractions of yards and inches being indicated by a dial and pointer. A further object of the invention is to provide a machine of this type with improved means for restoring the parts instantaneously to zero position. An additional object is to provide a machine of comparatively simple construction which is positive in operation.

In the accompanying drawings I have illustrated one embodiment of the invention.

Fig. 3 is an elevation, partly in section, of the opposite side of the machine;

Fig. 4 is a section on the line 4—4 of Fig. 3;

Fig. 5 is a section on the line 5—5 of Fig. 3;

Fig. 6 is a fragmentary elevation of the register;

Fig. 7 is a section on the line 7—7 of Fig. 3;

Fig. 8 is a section on the line 8—8 of Fig. 4;

Fig. 9 is an enlarged detail view of a modified form of carrying mechanism for the register; and Fig. 10 is an elevation of further details.

Figure 1:
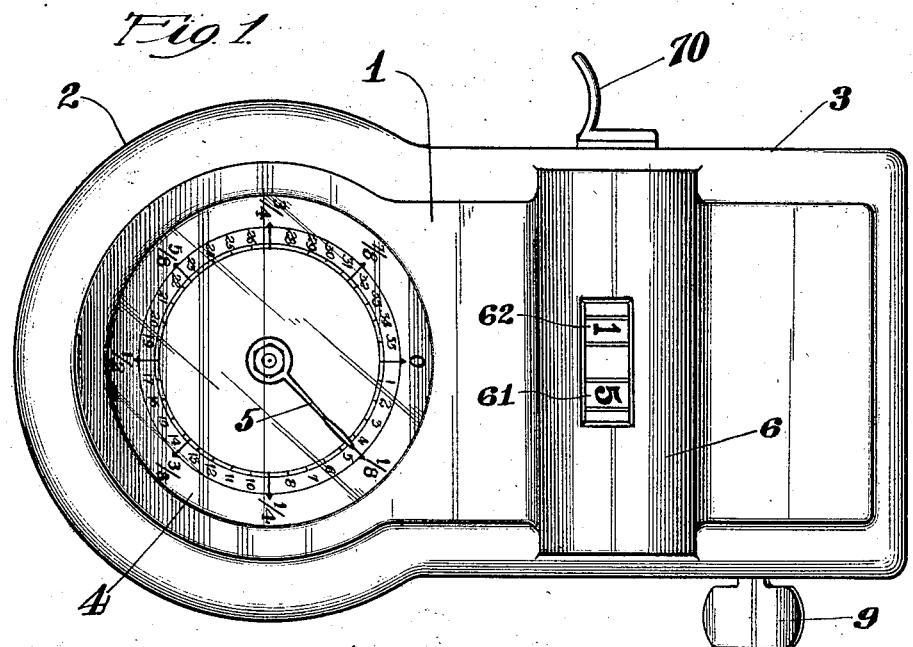
Figure 1 is a top plan view of the machine.

The mechanism is inclosed within a suitable casing 1, having preferably a cylindrical rear portion 2 and a rectangular forward portion 3. On the top of the cylindrical portion is a dial 4 and a pointer 5, which indicate fractions of a yard and inches. On the top of the rectangular portion is a semi-cylindrical extension 6, which contains the register for indicating the number of yards measured.

Figure 2:
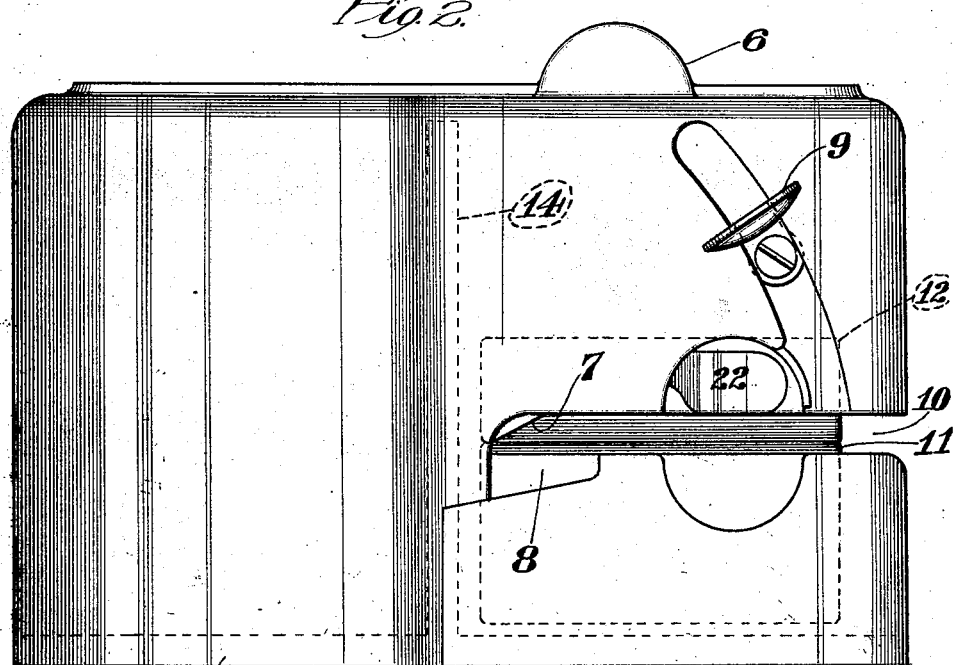
Fig. 2 is a side elevation thereof.

The machine is shown in Fig. 2 as provided with shears comprising a movable upper knife 7 and a stationary lower blade 8, which notch the goods when the notching button 9 is depressed. The casing has a horizontal opening 10, into which the fabric is slipped when it is to be measured. In this position it is arranged between two rollers, the lower roller 11 constituting a measuring roller, and the upper roller 12 being the pressure roller and being yieldingly held against the lower roller. The lower roller is, preferably, one-eighth of a yard in circumference. When the machine is at rest these rollers are normally separated but may be brought together, as hereinafter described, when a length of fabric is to be measured. The operator draws the fabric through the machine between the rollers, the register and dial indicating the exact length which has been passed between said rollers. At the end of the measurement the cloth is notched, the rollers are simultaneously separated, and the fabric removed from the machine.

The rollers and the gearing which connects them to the register and the dial are supported within the casing on a standard comprising a base plate 13 and a vertical plate 14. The measuring roller is secured to a supporting shaft 15, which passes through said plate and turns in a suitable bearing therein. The upper roller is mounted to turn freely on a supporting shaft 16, the latter constituting part of a rocker shaft 17. The upper roller is normally held against the lower roller with a yielding pressure, by means of springs 18 secured to short extensions 19 on the shaft 17. When the notching button 9 is depressed a projection 20 on said shaft is depressed by a part not shown, thereby raising the upper roller against the action of said springs. Said roller is held in uppermost position by the projection 20, which is caught by a heel 21 on the starting button 22, the latter constituting an extension on a bell crank lever 23, which is pivoted at 24, and held in locking position by a spring 25. To bring the rollers together in starting to measure, the operator presses the button 22, thereby rotating the bell crank lever and releasing the projection 20, whereby the springs press the upper roller against the fabric which is resting on the lower roller.

To prevent accidental movement of the measuring roller when no measurement is being taken, I provide a brake 26, consisting of a slotted plate supported on a pair of studs 27 and having a toothed extension 28 engaging a toothed collar or wheel 29, the latter being mounted on the same shaft 15 as the measuring roller and turning therewith. Said brake is suspended by a spring 30 from an arm 31 which is secured to the rocker shaft 17, whereby said brake is applied when the upper roller is raised and is released when said roller is lowered.

The rotary motion of the measuring roller is communicated to the registering dial by means of a train of gears, comprising a pinion 32 secured to the shaft 15 and engaging the gear 33, the latter turning with the pinion 34 which meshes with the gear 35. A bevel gear 36 turns with said gear 35 and rotates a second bevel gear 37 about a vertical axis, from which rotary movement is transmitted to the hand which rotates above the dial, as hereinafter described. A second gear 38 also turns with the gear 35 and meshes with a gear 39 (Figs. 4 and 6), the latter driving a pair of bevel gears 40 and 41 and additional gearing 42, 43, and 44 connecting with the register.

The pointer actuating mechanism is shown in section in Fig. 5. It comprises a vertically mounted spindle 45, arranged to rotate in a non-rotatable hollow sleeve 46 secured to the block 47 on the supporting plate 48. The spindle carries at its upper end the pointer 5, attached thereto by a nut 49. Said spindle also carries the female clutch member 50. A bushing 51 is rotatably mounted on said hollow sleeve, and carries the bevel gear 37. Said bushing also carries the male clutch member 52, the spring 53 normally holding said parts in engagement. A plate 54 is secured to the inside of the clutch member 52 and has a tongue which projects into a vertical slot 55 in said bushing, thereby preventing relative rotation of said bushing and clutch member, while permitting said clutch member to be lowered to disengage it from its mate.

The spindle 45 carries at its lower end a bushing 56 carrying two heart-shaped cams 57—see also Fig. 7. A plate 58 engages an annular groove 59 in the male clutch member, for the purpose of lowering the latter to disengage the clutch elements. During such disengagement the heart-shaped cams are engaged and restored to normal position, as hereinafter described, thereby restoring the pointer to zero position.

The register or length indicating means need not be described in detail herein, as it forms no part of the invention per se, being described in my co-pending application, Serial No. 319,058, filed August 22, 1919. It is preferably of a type which permits indefinite or limitless advancement in the forward, or counting direction. It consists in the present case of three register wheels 60, 61, and 62, driven from the gear 44, a suitable carrying mechanism being provided, as shown in Fig. 8. The numeral wheel 60 has no numbers on its periphery, and is not visible to the operator, as the fractions of a yard are indicated by the pointer and dial. However, fractional characters may be applied to the periphery, if desired, to give this duplicate reading. This wheel, however, effects the carrying of the units wheel of the next higher order, which in turn effects the carrying of the tens wheel, and so on, where a larger capacity is desired. Without this arrangement the units wheel would revolve continuously, and the reading would not be as convenient.

The carrying mechanism in Fig. 8 comprises a carrying wheel 65, which engages a star wheel 66 once in each revolution in a manner which is well understood, thereby rotating the adjacent counter wheel. A detent roller 67 engages a detent wheel 68, and prevents overthrow.

The structure shown in Fig. 9 is somewhat similar, and the same reference characters, 65', 66', 67', and 68' have been employed to indicate corresponding parts.

It will be seen that the register indicates the total number of whole yards measured, and that the pointer and the dial indicate fractions of a yard and inches. Although the register has a normal capacity of one hundred yards, the measurement may be continued indefinitely as the register wheels continue rotating after this limit has been passed, the cycle of operations being repeated as often as necessary. However, for practical purposes a normal capacity of one hundred yards is sufficient in most cases.

When the measurement has been completed the parts are set to zero position by means of the following mechanism (see Figs. 3 and 4): A resetting button 70 projects from the side of the machine, and is pushed forward by the operator. This button is an extension of a plate which is secured to a slide bar 71 by suitable fastening means 72, the inner end of said plate having a notch 73. Said bar is mounted so as to slide longitudinally, being held normally in rear-most position by a spring 74. The notch 73 engages a vertically disposed lever 75, secured to the shaft 76, (see Fig. 4) whereby the forward movement of said bar will operate the re-setting mechanism for the register, said mechanism (as shown in Fig. 8) including actuating pawls 77 which engage the heart-shaped cams 78, thereby restoring the numeral wheels to zero position. Just prior to said restoration, however, a beveled upper corner 80 on the lever 75 engages the end of the shaft 81 and moves it to the right, (see Fig. 4) thereby opening a clutch composed of two clutch members 82 and releasing the gear 44 from the first numeral wheel, and permitting restoration of the parts, as explained more fully in the said copending application above referred to.

The pointer over the dial is simultaneously reset to zero position, the bar 71 when moved forward carrying with it a plate 83, secured thereto by screws 84, or other fastenings—see Fig. 10. Said plate has a longitudinal cam 85 secured thereto, which is caused to engage a roller 86 mounted on an apron 87 on a plate 58, thereby rocking said plate about a shaft 88, to which it is secured, said shaft being mounted in the bracket 89. (See also Figs. 3 and 4). This slight downward movement of the plate 58 disengages the clutch members 50, 52. The spindle 45, carrying the pointer 5, is thereupon rotated to zero position by means of the heart-shaped cams 57, which are engaged by the pointed end of the bell crank lever 90 and the pointed projection 90ª formed on the horizontally disposed portion of the plate 83. (See Figs. 7 and 10). The lever 90 is mounted on the vertical pivot 91, and has a spring 92 secured thereto, which normally holds it against a stop 93. The points 90 and 90ª are slightly displaced, and the heart cams 57 are arranged at a small angle to each other, thereby ensuring additional movement of one cam or the other, and preventing locking of the parts on dead center.

The wheels of the indicating mechanism are capable of indefinite or limitless advancement in the forward direction. The machine's capacity of course depends upon the number of these wheels employed in the register, but in making a measurement, even if this capacity is exceeded, the effect will simply be to bring all the number wheels to the zero position so that the machine will commence measuring again from zero. The machine illustrated will measure 100 yards, but to increase the capacity of the machine it is merely necessary to add another number wheel such as the number wheel 62 with carrying mechanism corresponding to it.

The invention is not to be limited to the particular embodiment thereof described herein, as various other structures may be devised which will fall within the scope of the claims.

I claim:—

1. In a fabric measuring machine, the combination of a measuring roller mounted to be rotated by the goods passed thereover, a dial, a pointer co-operating with the dial for indicating fractions of the unit of measure, said pointer being capable of unlimited rotation, means actuated by said measuring roller for driving the pointer without limit in the forward direction, and a numeral wheel co-operating with the pointer for indicating the number of revolutions made by the pointer in each complete measuring movement.

2. In a fabric measuring machine the combination of a measuring roller mounted to be rotated by the goods passed thereover, a dial, a pointer co-operating with the dial for indicating fractions of the unit of measure, means actuated by the measuring roller for driving the pointer, indicating mechanism having rotatable number wheels of different denominations for indicating the number of revolutions made by the pointer in each complete measuring movement, and means for advancing the number wheel of lowest denomination as the pointer completes each revolution during the measuring movement.

3. In a fabric measuring machine, a measuring roller mounted to be rotated by the goods passed thereover, a dial and a single cooperating pointer for indicating a unit of measure and fractions thereof, said pointer being actuated by said measuring roller to rotate continuously through more than one revolution around said dial, a register comprising a plurality of numeral wheels, and means for simultaneously resetting said pointer and said register to zero position.

4. In a cloth measuring machine, a measuring roller, a dial and a single cooperating pointer for indicating fractions of a yard, gearing between said pointer and said roller, a register for indicating total yardage, said register being connected with said gearing, means for simultaneously disconnecting said register and said pointer from said gearing and for resetting them to zero position without rotating said measuring roller, and a brake for preventing movement of said measuring roller during said resetting operation.

5. In a fabric measuring machine, the combination with a casing having openings therein, of a measuring roller within said casing and accessible through one of said openings, a register comprising numeral wheels visible through another of said openings, a dial, a rotating pointer therefor visible through another opening, mechanical connections between said roller and both of said indicating devices including a pair of clutches, a brake normally preventing rotation of said measuring roller, a manually operable lever accessible through an opening to remove said brake, a manually operable lever accessible through an opening for applying said brake at the end of an operation, and a manually operable lever accessible through an opening for operating both of said clutches, thereby permitting restoration of both indicators to zero position.

6. In a fabric measuring machine, the combination of a pair of rollers one of which constitutes a measuring roller, a register mechanically connected with said measuring roller and driven thereby, a dial, a pointer co-operating with the dial and also driven by the measuring roller, said register having a continuously rotating fraction wheel hidden from view, and having a plurality of number wheels with carrying mechanism for periodically advancing the same by movement imparted by the continuously rotating fraction wheel, said pointer cooperating with the dial to indicate fractions of the unit of measure, and said number wheels operating to indicate the total number of revolutions of the pointer in a complete measuring movement.

7. In a fabric measuring machine, the combination of a measuring roller mounted to be rotated by the goods passed thereover, a dial indicating one unit of measure with its fractional divisions, a pointer co-operating with the dial, means actuated by the measuring roller for driving the pointer continuously and indefinitely in a forward direction, indicating mechanism other than the pointer having rotatable indicating wheels capable of indefinite rotation in a forward direction also driven by the measuring roller, the indicating wheels operating to indicate the total number of revolutions made by the said pointer in a measuring movement.

In testimony whereof, I have subscribed my name.

DOUGLAS TURNER.